(12) United States Patent
Zhou et al.

(10) Patent No.: US 6,249,443 B1
(45) Date of Patent: Jun. 19, 2001

(54) NINE-PHASE TRANSFORMER

(75) Inventors: Dongsheng Zhou, Cedarburg; Gary Leonard Skibinski, Milwaukee; Nickolay N. Guskov, Mequon, all of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/616,163

(22) Filed: Jul. 14, 2000

(51) Int. Cl.[7] .................................................. H02M 5/10
(52) U.S. Cl. ................................................. 363/5; 363/155
(58) Field of Search ....................... 363/3, 5, 8, 153–156

(56) References Cited

U.S. PATENT DOCUMENTS

| | | | |
|---|---|---|---|
| 3,585,484 | * 6/1971 | Dortort et al. | 363/5 |
| 4,255,784 | 3/1981 | Rosa | 363/129 |
| 4,683,527 | * 7/1987 | Rosa | 363/5 |
| 4,779,181 | 10/1988 | Traver et al. | 363/154 |
| 4,876,634 | 10/1989 | Paice | 363/5 |
| 5,068,774 | 11/1991 | Rosa | 363/3 |
| 5,124,904 | 6/1992 | Paice | 363/3 |
| 5,148,357 | 9/1992 | Paice | 363/5 |
| 5,455,759 | 10/1995 | Paice | 363/126 |
| 5,619,407 | 4/1997 | Hammond | 363/155 |

* cited by examiner

Primary Examiner—Matthew Nguyen
(74) Attorney, Agent, or Firm—Michael A. Jaskolski; John J. Horn; A. M. Gerasimow (57) ABSTRACT

The invention includes a transformer for converting three-phase AC power to nine-phase AC power. An autotransformer includes three coils, each coil including a plurality of serial windings that together form a polygon. Nine output nodes are provided between adjacent winding pairs, the windings sized and arranged such that adjacent output voltages are separated by 40 degree phase shift and such that output voltage magnitudes are essentially identical. Both step-up and unity gain input node sets are provided wherein, when three phase AC supply lines are linked to the step-up input set the output voltage is stepped up and when the three phase AC supply lines are linked to the unity gain input set the transformer gain is unity. An isolation transformer includes a secondary arranged like the autotransformer configuration described above.

34 Claims, 4 Drawing Sheets

NINE-PHASE TRANSFORMER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to transformers for converting three-phase power to nine-phase power, and more particularly to transformers for providing reduced harmonics on the AC and minimizing ripple on the DC side of an AC to DC rectifier.

Rectifiers are used to rectify AC voltages and generate DC voltages across DC buses. A typical rectifier includes a switch based bridge including two switches for each AC voltage phase which are each linked to the DC buses. The switches are alternately opened and closed in a timed fashion, which, as the name implies, causes rectification of the AC voltage. As well known in the energy industry the global standard for AC power distribution is three phase and therefore three phase rectifier bridges are relatively common.

When designing a rectifier configuration there are three main considerations including cost, AC line current harmonics and DC bus ripple. With respect to AC current harmonics, when an AC phase is linked to a rectifier and rectifier switches are switched, the switching action is known to cause harmonics on the AC lines. AC line harmonics caused by one rectifier distort the AC voltages provided to other commonly linked loads and therefore should generally be limited to the extent possible. In fact, specific applications may require that large rectifier equipment be restricted in the AC harmonics that the equipment produces.

With respect to DC link ripple, rectifier switching typically generates ripple on the DC bus. As with most hardware intensive configurations cost can be minimized by using a reduced number of system components and using relatively inexpensive components where possible.

It is well known in AC to DC rectification that AC current harmonics and DC ripple may be improved by increasing the number of AC phases, which are rectified by the rectifier. These AC phases are phase-shifted from each other. For example, by rectifying nine-phase AC current instead of three-phase, harmonics and ripple are reduced appreciably. Where AC harmonic restrictions are placed on rectifier systems such restrictions are often satisfied by employing an 18-pulse rectifier that requires a nine-phase source of AC power. As the global standard for AC power distribution is three phase, 18-pulse rectifiers require three-to-nine phase power converters between utility supply lines and rectifier switches.

Isolation transformers for converting three-phase AC power to nine-phase AC power are known in the art but have several shortcomings. First isolation transformers must be rated for the full power required. Second, isolation transformers are typically relatively large as separate primary and secondary windings are required for isolation purposes.

Where isolation between a utility supply and a rectifier is not required, employing an autotransformer including a plurality of series and common windings may advantageously reduce the size and weight of a three-to-nine phase converter which consists of an autotransformer and a rectifier unit. Exemplary three-to-nine phase autotransformers are described in U.S. Pat. Nos. 4,876,634 (the "'634 patent"); U.S. Pat. No. 5,124,904 (the "'904 patent"); U.S. Pat. No. 5,619,407 (the "'407 patent"); and U.S. Pat. No. 5,455,759 (the "'759 patent"), each of which is incorporated herein for the purpose of describing the prior art.

The '634 patent teaches the general concept of providing three phase autotransformer coils in a plurality of series connected windings which are arranged to form a hexagon. Three phase AC input lines are linked to three input nodes and nine output nodes provide voltages to three rectifier bridges. Phase shift between the output voltages is accomplished by providing long and short windings between the input nodes and the output nodes. Importantly, the '634 patent teaches that, for each autotransformer input phase, the phase shift between three corresponding output voltages should be 20 degrees and accomplishes 20 degree phase shift by providing short windings between each two adjacent output nodes corresponding to the same input phase. Long windings are provided between adjacent output nodes corresponding to different input phases. In the '634 patent the nine output voltages are provided to three separate six-pulse bridges.

Unfortunately, there are at least two problems with the 18-pulse autotransformer described in the '634 patent (hereinafter the '634 topology). First, there is an inherent impedance mismatch in the '634 topology which results in looping currents among the three bridges and which requires additional hardware to correct. For example, when the outputs and inputs to the '634 18-pulse autotransformer are linked to provide unity gain one of the three bridges is fed directly from the input power source while the other two bridges are fed through transformer windings which each are characterized by a certain amount of leakage inductance. This means that there are different impedances for each of the bridges and the different impedances cause disparate DC output voltages and hence looping currents among the bridges. A similar impedance disparity results when the '634 patent 18-pulse autotransformer is linked for step-down transformation.

The '634 topology attempts to use two inter-phase transformers to reduce the looping currents. As an initial matter Applicant believes the inter-phase transformers provided in the '634 topology are erroneously specified and that six, not two, inter-phase transformers would be required to reduce the looping currents. While six inter-phase transformers can be provided inter-phase transformers are required to carry DC bus currents and therefore are relatively bulky and increase system size appreciably. In addition the six inter-phase transformers are relatively expensive and increase system costs.

Second, the '634 topology would result in current sharing problems among the three bridges due to enclosed electrical circuits formed by the multi-phase shift bridges. The current sharing problems are exacerbated when AC line harmonics occur as different source harmonics substantially change bridge current sharing. Because AC line harmonics are often irregular and unpredictable it is impossible to balance the impedance mismatch via addition of resistance elements. While the inter-phase transformers are may ease current harmonics to the power source, the inter-phase transformers are not effective as a solution for the current sharing problem.

Because of the current sharing problem described above all three bridges in the '634 topology have to be capable of handling over-rated current conditions as high as 150% of the current level required to be handled if the bridges were able to share current equally. This is because form time to time each bridge is forced to operate close to its rated current level while the other bridges only operate at 50% of their rated level. This drastic current difference among bridges also forces the windings of the '634 topology to carry appreciably disparate current magnitudes. For this reason, in addition to the bridges having high current ratings, the autotransformer also must be rated to handle high current value and therefore results in inefficient material utilization.

One solution to the looping and sharing current problems associated with the '634 topology is to provide an autotransformer that equally spaces output voltages in phase. For example, where there are nine outputs, the outputs can be phase shifted from each other by 40 degrees each. In the '407 patent this is accomplished by providing an autotransformer having three coils, each coil having a plurality of serial windings and a plurality of stub windings. The serial windings form a delta and the stub windings are magnetically coupled with the serial windings from the same coil. Three terminals are provided ad the apices of the delta and the three phase AC inputs are linked to the apex terminals. A plurality of direct outputs is interposed between respective serial windings and a plurality of indirect outputs is electrically connected with the second ends of the stub windings. The windings are chosen such that the voltage magnitudes of the direct and indirect outputs are identical. Other autotransformer topologies which include stub windings are described in the '904 patent and the '759 patent.

While staggering the transformer outputs by 40 degrees essentially eliminates the looping and sharing current problems identified above, the stub winding requirement in each of the '407, '904 and '759 patents renders those solutions wasteful of winding and core material.

While all of the prior art autotransformers identified above teach topologies that cause step-down transformation, some DC loads require DC voltage magnitudes that are higher than an AC input voltage magnitude. In these cases the step-down transformers described above are not suitable and instead a step-up transformer is necessary.

Despite the relatively large size of isolation transformers some applications require isolated primary and secondary windings. In the isolated transformer topologies many of the same design concerns have to be considered. For example, isolation transformers should be designed so as to minimize input current harmonics, minimize DC bus voltage ripple, eliminate bus current sharing problems, reduce overall transformer size and minimize required materials thereby reducing costs.

Thus, it would be advantageous to have a three-to-nine phase transformer that did not cause looping and sharing current problems and that is relatively inexpensive to construct. In the case of an autotransformer it would be advantageous if the transformer could be used either as a unity gain or a step-up transformer.

SUMMARY OF THE INVENTION

The present invention includes an autotransformer for transforming three phase AC input voltages to nine-phase AC output voltages wherein the transformer includes three coils, each coil forming a plurality of series windings, the windings arranged to form a polygon. Nodes between the windings form nine output nodes, at least one step-up input set (i.e., three step-up input nodes) and at least one unity gain input set (i.e., three unity gain input nodes). The windings are sized and configured such that the voltage magnitudes at the output nodes are identical, the voltage magnitudes of the step-up input set are identical, the voltage magnitudes of the unity gain input set are identical, the unity gain set voltage magnitudes are identical to the output node voltage magnitudes, the step-up input set voltage magnitudes are less than the output node voltage magnitudes, adjacent output nodes are separated by 40 degree phase shifts and the nodes in each input set are 120 degrees out of phase (i.e., the second node in each input set is 120 degrees out of phase with the first and third nodes in the set and the third node is 120 degrees out of phase with the first node in the set).

Thus, one object is to provide an autotransformer that avoids the looping and current sharing problems discussed above. To this end, because the output voltages have identical magnitudes and are equi-phase-shifted (i.e., adjacent output node voltages are 40 degrees out of phase), looping and current sharing problems are essentially eliminated.

Another object is to achieve the aforementioned object relatively inexpensively. To this end the present autotransformer only includes serial windings and does not require stub windings. Thus, less winding material is required to provide the desired transformation results.

One other object is to provide a step-up transformer that avoids the looping and current sharing problems. To provide a step-up autotransformer the present configuration provides the step-up input set of input nodes where the magnitudes of voltages at the step-up input set are less than the magnitudes at the output nodes.

Yet another object is to provide a single autotransformer that can be used either as a step-up transformer or as a unity gain transformer. This feature enables a manufacturer to provide a single transformer that can be used in two different applications and therefore reduces design and manufacturing costs as only a single autotransformer has to be designed and manufactured instead of two different autotransformers. To this end the preferred autotransformer configuration provides both the step-up input set and the unity gain input set.

The invention also includes an isolation transformer having three input lines linked to a primary and nine output lines linked a secondary. The primary may be in either a delta or a wye form including three primary windings separated by 120° phase shift. The secondary preferably has the same form as the three-phase autotransformer configuration described above with the nine outputs linked to the secondary as described (i. e., with 40° of phase shift between each two adjacent outputs). In this manner the isolation transformer achieves many of the same advantages achieved with the inventive autotransformer. In addition, as the name implies, the isolation transformer isolates the primary and secondary windings. Furthermore, the isolation transformer may be configured such that the primary windings are tab adjustable so that the transformer turns ratio can be adjusted "in the field" to cause step-up, step-down or unity gain to accommodate field source characteristics and facilitate optimal system operation.

A complete understanding of the present invention will be obtained from the following description and the accompanying figures.

DETAILED DESCRIPTION OF THE INVENTION

The invention includes both an autotransformer configuration and an isolation transformer configuration.

Step-Up And Unity Phase Shifting Autotransformer

Figure 1:
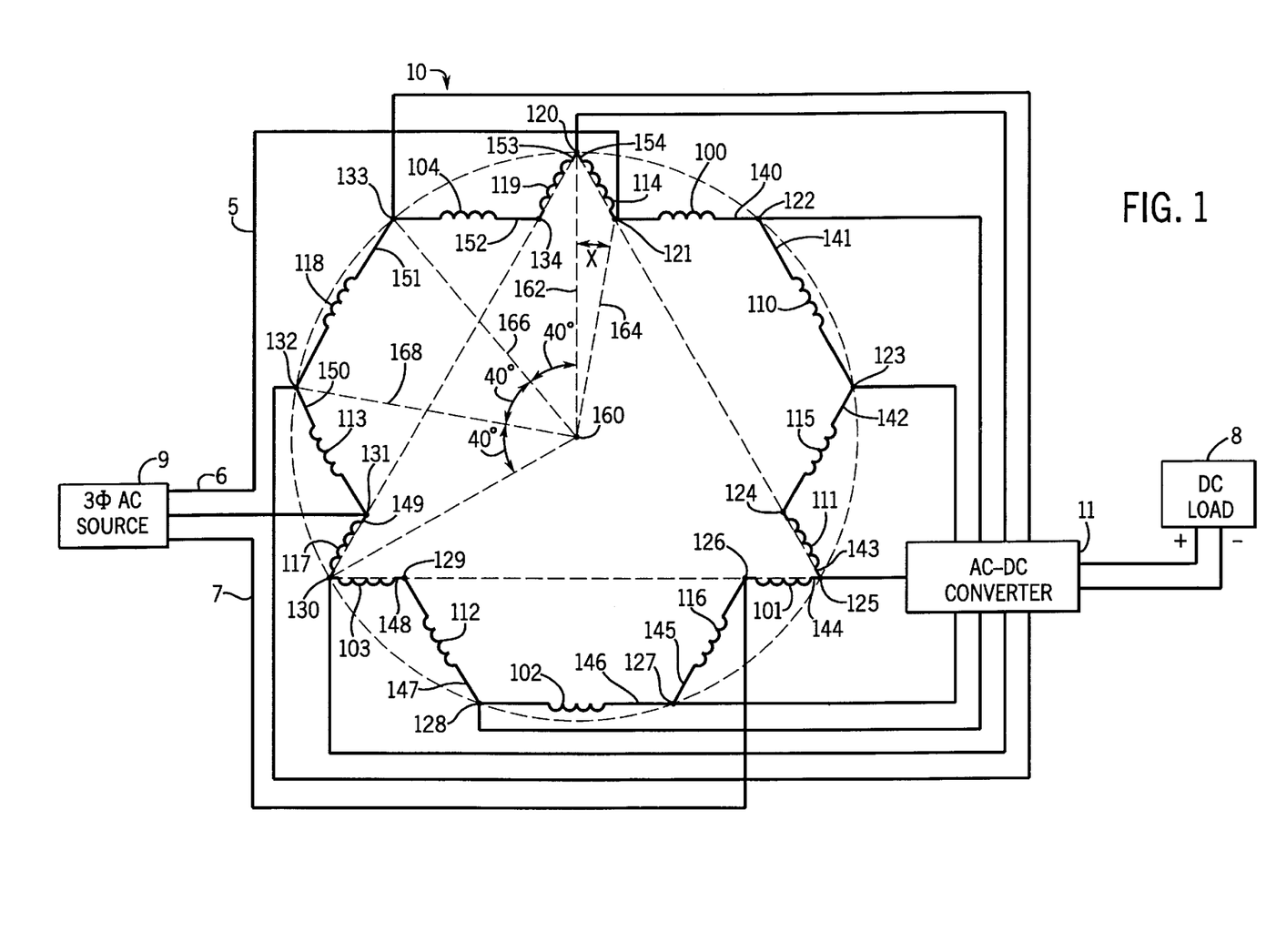
FIG. 1 is a schematic diagram of a preferred embodiment of the inventive autotransformer including fifteen windings arranged to form a step-up and unity gain transformer, the transformer linked to an input three phase supply, a nine-phase converter and a DC load.

Referring now to the drawings wherein like reference numbers throughout the several views correspond to similar or like components and, specifically referring to FIG. 1, a first embodiment of the invention includes inventive autotransformer 10 is illustrated in an exemplary environment. Transformer 10 is shown linked to a 3-phase AC source 9 via three input or supply lines 5, 6 and 7 and is also linked via nine output lines 30 through 38, respectively, to a 9-phase rectifier 11 and a DC load 8. Rectifier 11 and other rectifier designs are well known in the electrical arts and therefore rectifier 11 will not be explained here in detail.

Figure 2:
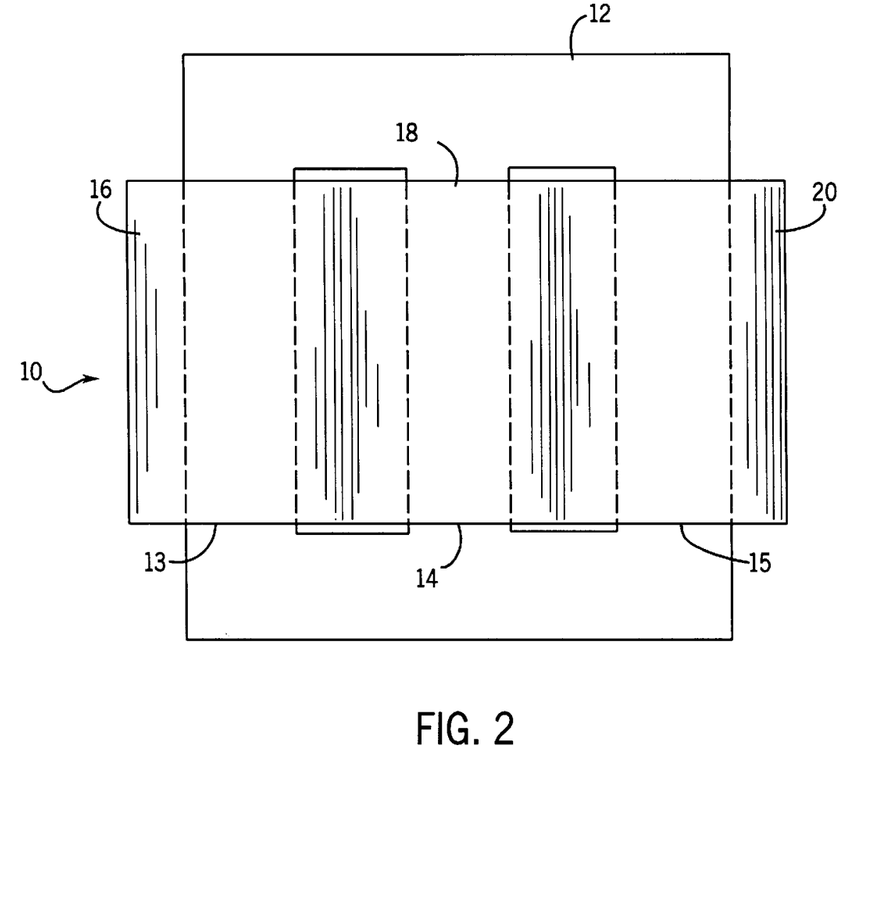
FIG. 2 is a front view of a core and coils of an autotransformer according to the present invention.
Figure 3:
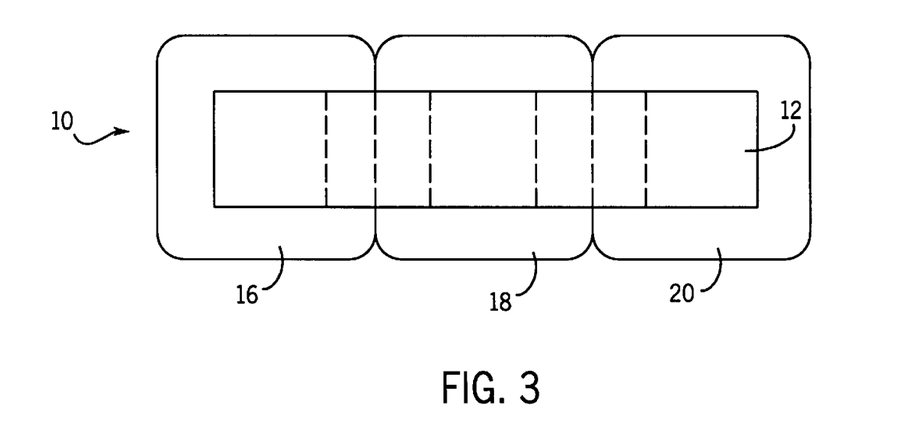
FIG. 3 is a plan view of the core and coils of FIG. 2.

Referring also to FIGS. 2 and 3 autotransformer 10 is constructed on a laminated core 12 of electrical grade steel such as M-6 provided by Armco Incorporated of Middletown, Ohio. The laminated core 12 may have three equal paths or legs 13, 14, 15 for magnetic flux. The core 12 preferably has no other magnetic flux paths than the three traversing poles 13, 14, 15 such that the flux flowing down through one pole (e.g., pole 14) must return upwards through another pole (e.g., pole 13 or 15).

The poles 13, 14 and 15 pass through first, second and third coils 16, 18 and 20, respectively, each coil including a plurality of windings. For example, first coil 16 includes first through fifth windings 100 through 104, the second coil 18 includes first through fifth windings 110 through 114, and the third coil 20 includes windings 115 through 119 as shown in FIG. 1.

Each winding 100–104, 110–119 may be constructed using a single winding specific wire. In the alternative, several series windings may be constructed using a single wire or all of the windings may be constructed using a single wire. Preferably all of the windings have a similar construction, the distinction being primarily in the number of turns that are included in each winding.

Each winding 100 through 104 in coil 16 on pole 13 of the core 12 will experience the same induced volts per turn from the flux within pole 13. The same will be true for windings 110 through 114 in coil 18 on pole 14 and for windings 115 through 119 in coil 20 on pole 15. Therefore, each winding 100–104, 110–114 and 115–119 on the same respective pole 13, 14, 15 will be in phase with one another.

On each pole all windings are wound such that their polarities are in the same direction so that inductance along the windings adds up along the magnetic path. Thus, if the right end of winding 100 is a start end the right end of winding 101 is also a start end and the right end of winding 102 is likewise a start end and so on.

As illustrated, the windings are linked in a series fashion to form a polygon shape including first through fifteenth legs 140–154, respectively. The fist coil first through fifth windings 100 through 104, respectively, are arranged on the first, fifth, seventh, ninth and thirteenth legs, 140, 144, 146, 148 and 152, respectively. The second coil first through fifth windings 110 through 114, respectively, are arranged on the second, fourth, eighth, eleventh and fifteenth legs 141, 143, 147, 149 and 154, respectively. The third coil first through fifth windings 115 through 119 are arranged on the third, sixth, tenth, twelfth and fourteenth legs 142, 145, 149, 151 and 153, respectively. The first through fifteenth legs are linked in series to form the polygon illustrated in FIG. 1.

Fifteen separate nodes are formed at the joining points between adjacent windings including nodes 120 through 134. The illustration in FIG. 1 can be thought of as a voltage plane wherein distance between any of nodes 120 through 134 and a neutral or origin 160 represents the voltage magnitude at the corresponding node. For example, a vector 162 is formed between origin 160 and node 120, which represents voltage magnitude at node 120. A slightly shorter vector 164 is formed between origin 160 and node 121. Thus, comparing vectors 162 and 164 the voltage magnitude at node 120 is clearly greater than the voltage magnitude at node 134. Similar voltage magnitude vectors can be drawn for each node in FIG. 1.

The angle between two vectors (e.g., 162 and 164) represents a phase shift angle between two node voltages. Nine of the fifteen nodes in FIG. 1 are output nodes. The nine output nodes include first through ninth output nodes 120, 122, 123, 125, 127, 128, 130, 132 and 133. Importantly, the windings are arranged and sized such that the phase shift between each two adjacent output node voltages is essentially 40 degrees. For example, the phase angle between voltages at nodes 133 and 120 is 40 degrees. Similarly, the phase shifts between voltages at nodes 120 and 122, 122 and 123, 123 and 125, 125 and 127, 127 and 128, 128 and 130, 130 and 132; and 132 and 133 are each 40 degrees.

Similarly, the windings are sized and arranged such that the voltage magnitude vectors at each output node are identical. For example, each of vectors 162, 166 and 168 are identical (see still FIG. 1).

Autotransformer 10 can be used as either a step-up transformer or as a unity gain transformer. To use transformer 10 as a step-up transformer, either one of two node sets can be selected as input nodes to be linked to the supply lines 5, 6 and 7 (see supply lines in FIG. 1). Each of the two input node sets that can be used for step-up transformation is separately referred to herein as a step-up input set. Referring still to FIG. 1, a first step-up input set includes nodes first, second and third input nodes 121, 126 and 131, respectively, each of those nodes separated by 120 degrees of phase shift.

It should be appreciated that voltage magnitude vector 164 corresponding to input node 121 is shorter than the output node voltage magnitude vectors (e.g., 162, 166, 168, etc.). Similarly, although not illustrated, the voltage magnitude vectors corresponding to each of input nodes 126 and 131 are identical to vector 121 and are each shorter than the output voltage magnitude vectors. Hence, the resulting output voltage is stepped down when lines 5, 6 and 7 are linked to input nodes 121, 126 and 131.

The step-up magnitude between primary and secondary voltages is proportional to the ratio of the lengths of supply and output voltage magnitude vectors in FIG. 1. For example, the step-up magnitude will be proportional to the ratio of the length of vector 162 (i.e., the length of the output vector) to the length of vector 164 (i.e., the length of a supply vector). The following equations can be formulated from the trigonometric relationship in FIG. 1:

$$\frac{\overline{162}}{\overline{164}} = \frac{1}{\sqrt{(\sin 50°)^2 + [\tan(30°)(1-\sin 50°)]^2}} \approx 1.28 \qquad \text{Eq. 1}$$

Thus the voltage step-up magnitude is 28%.

FIG. 1 can also be used to identify the lengths of each of windings 100 through 104 with respect to the length of the supply voltage magnitude vector 162. The relationships among the lengths of windings 110 through 114 and 115 through 119 are the same as among the lengths of windings 100–104, respectively (i.e., the ratio of winding 110 to winding 111 is the same as the ratio of winding 100 to winding 101 and so on). Using FIG. 1 the following relationships can be developed:

$$\overline{104}=\overline{100}=[\cos 50° - \tan 30°(1-\sin 50°)]\overline{162} \approx 0.5077*\overline{162} \qquad \text{Eq. 2}$$

$$\overline{103}=\overline{101}=\frac{1-\sin 50°}{\cos 30°}\overline{162} \approx 0.2701*\overline{162} \qquad \text{Eq. 3}$$

$$\overline{102}=2*\sin 20° \ \overline{162} \approx 0.6840*\overline{162} \qquad \text{Eq. 4}$$

The lengths expressed in Equations 2 through 4 are proportional to the turn ratios of windings 100 through 104. Thus, for windings 100 through 104 the turn ratios are:

$$104:100:103:101:102:=1:1:0.532:0.532:1.3473 \qquad \text{Eq. 5}$$

Although non-integral turns can be configured, integral turns for a winding are preferred for ease of manufacture. The following table lists possible winding turn combinations available to achieve the required turn ratios indicated above in Equation 5. In addition, a maximum error introduced because of integral winding turn numbers is also indicated.

TABLE 1

| Combination # | 104 | 100 | 103 | 101 | 102 | Max Error |
|---|---|---|---|---|---|---|
| 1 | 15 | 15 | 8 | 8 | 20 | 0.71% |
| 2 | 17 | 17 | 9 | 9 | 23 | 0.29% |
| 3 | 21 | 21 | 11 | 11 | 28 | 0.71% |
| 4 | 23 | 23 | 12 | 12 | 31 | 0.52% |

Combination 2 has the lowest maximum error and therefore is preferred.

A second step-up input set (i.e., step-up input node set) that results in step-up transformation includes first, second and third nodes 124, 129 and 134, respectively. Operation of transformer 10 with this linking is essentially identical to the operation indicated above.

Referring still to FIG. 1, although not illustrated, to use transformer 10 as a unity gain transformer, lines 5, 6 and 7 can be linked to any of three separate input node sets. Herein, each of the unity gain input node sets is referred to separately as a unity gain input set to differentiate the unity gain input sets from the step-up input sets. In addition, while the step-up input nodes were referred to as first, second and third nodes, the unity gain nodes in each set will be referred to as fourth, fifth and sixth nodes to differentiate between the step-up and unity gain nodes.

A first unity gain input set includes fourth, fifth and sixth nodes 120, 125 and 130, each of the fourth, fifth and sixth nodes separated by 120 degrees of phase shift. It should be appreciated that when transformer 10 is connected for unity gain, voltage magnitude vector 162 corresponding to fourth input node 120 has the same length as the output node voltage magnitude vectors (e.g., 162, 166, 168, etc.). Similarly, although not illustrated, the voltage magnitude vectors corresponding to each of the fifth and sixth input nodes 125 and 130, respectively, are identical to vector 162. Hence, as the nomenclature indicates, the voltage gain is unity when transformer 10 is inked in this manner.

Other unity gain input sets that yield unity gain include node set 123, 128 and 133 as well as node set 122, 127 and 132. Operation of transformer 10 when linked to each of these other unity gain sets is essentially as described above.

Isolation Phase-Shifting Transformer

Figures 4, 5:
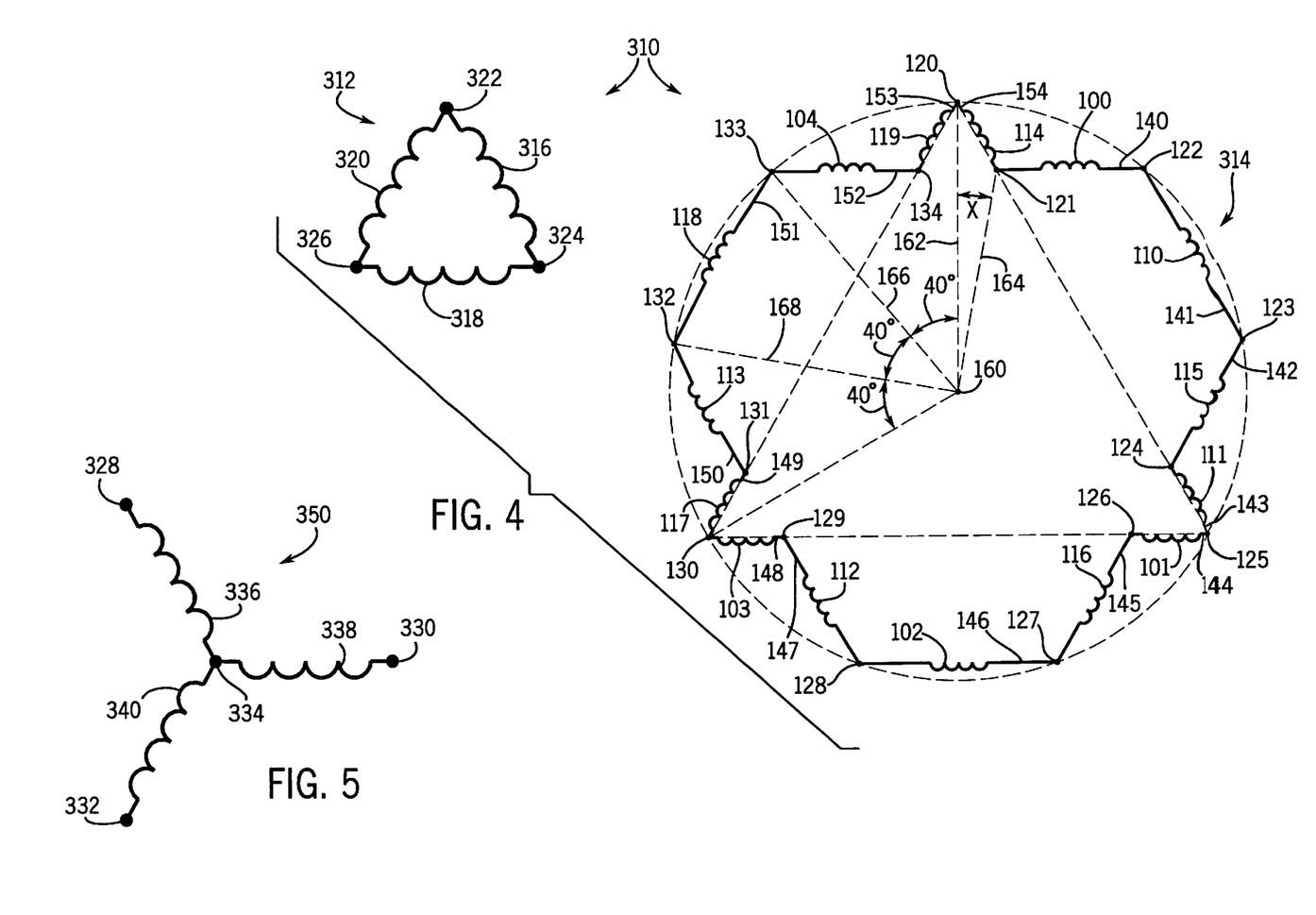
FIG. 4 illustrates an inventive isolation transformer including a "delta-wound" primary.
FIG. 5 illustrates a "wye-wound" primary that can be substituted for the delta wound primary of FIG. 4 to configure yet another inventive embodiment.

Referring now to FIG. 4, an exemplary isolation transformer configuration 310 is illustrated. Configuration 310 includes a primary 312 and a secondary 314. Primary 312 includes three primary coils 316, 319 and 320 which are wound in a delta configuration such that coil 316 is linked to coil 318 at an apice 324, coil 318 is linked to coil 320 at an apice 326 and coil 320 is linked to coil 316 at a third apice 322. Referring also to FIG. 1, although not illustrated in FIG. 4, three input lines 5, 6 and 7 from a source 9 are linkable to apices or input nodes 322, 324 and 326, respectively to provide current thereto.

Referring still to FIGS. 1 and 4, the components of secondary 314 are arranged in a manner essentially identical to the components of autotransformer 10, albeit without being linked to the input lines 5, 6 and 7 (which are linked to primary 312). As with the autotransformer, in FIG. 4, secondary nodes are formed by the linking of adjacent windings. The secondary nodes include nine output nodes. Output nodes 120, 122, 123, 125, 127, 128, 130, 132, and 133 are linkable to output lines (see FIG. 1) which feed an AC/DC converter (shown as numeral 11 in FIG. 1). The secondary coils form secondary windings, the secondary windings arranged such that there is a 40° phase shift between adjacent output nodes as illustrated. In addition, the secondary windings are arranged such that secondary windings 100, 101, 102, 103 and 104 are in phase with primary winding 318, secondary windings 110, 111, 112, 113 and 114 are phase with primary winding 316 and secondary windings 115, 116, 117, 118 and 119 are in phase with primary winding 320. Moreover, in this embodiment, at least a sub-set of secondary node voltage magnitudes (e.g., magnitudes at nodes 134, 121, 124, 126, 129 and 131) are less than the output voltage magnitudes (e.g., at nodes 120, 122, etc.).

In addition to facilitating many of the advantages indicated above with respect to the autotransformer, adjustable taps may be provided on primary 312 so that the turns-ratio of primary to secondary windings can be altered thereby modifying the transformation action of transformer 310 so that transformer 310 can be used as either a step-up, step-down or unity gain transformer.

Referring now to FIGS. 4 and 5, FIG. 5 illustrates a wye wound primary 350 which can be substituted for delta wound primary 312 in FIG. 4 to provide a second isolation transformer configuration according to the present invention. To this end, primary 350 includes three windings 336, 338 and 340, each of which has one end linked at a central node 334. The other ends of windings 336, 338 and 340 are linked to input nodes 328, 330 and 332, respectively. Referring also to FIG. 1, in this embodiment input lines 5, 6 and 7 of source 9 are linkable to input nodes 328, 330 and 332, respectively. In this embodiment secondary 314 would be essentially identical to secondary 314 illustrated in FIG. 4 with windings 100–104 being in phase with winding 338, windings 110–114 being in phase with winding 336 and windings 115–119 being in phase with primary winding 340. Operation of this transformer would be similar to operation of the transformer including the delta primary described above.

Figure 6:
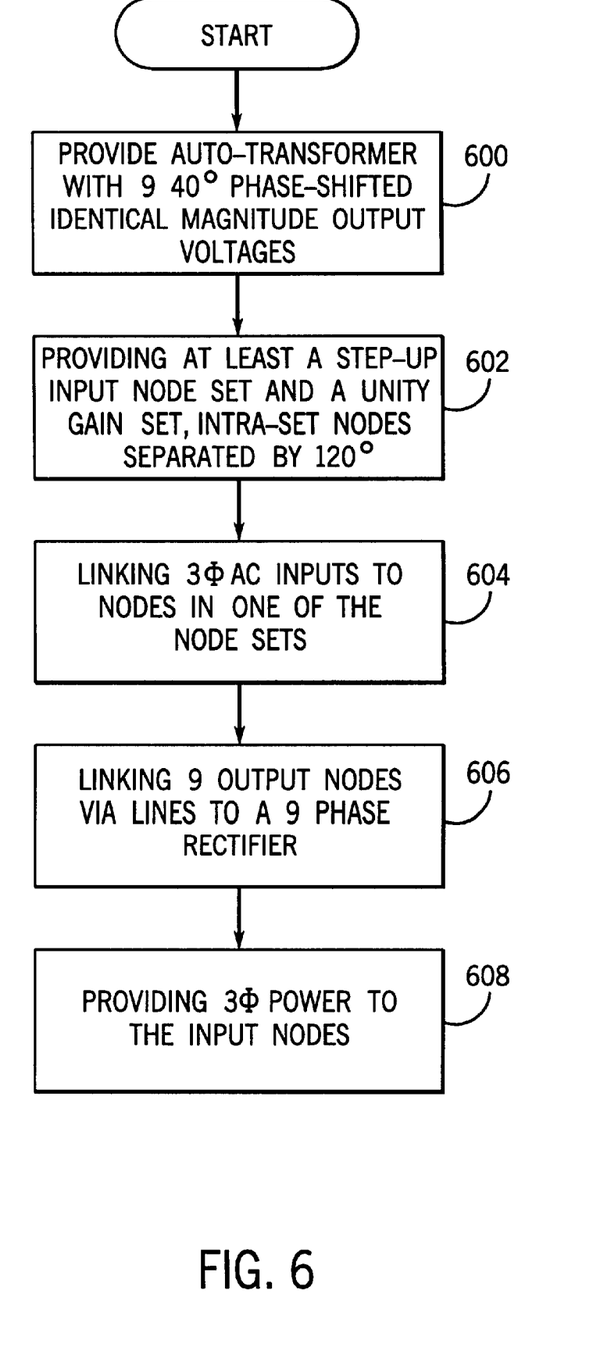
FIG. 6 is an exemplary inventive method.

Referring now to FIG. 6, therein is illustrated an inventive method for configuring a nine-phase transformer. To this end, at process block 600, the first step is to provide an autotransformer with nine 40° phase-shifted identical magnitude output voltage nodes. Next, at step 602 at least a step-up input node set and a unity gain node set are provided wherein intraset nodes are separated by 120° phase-shift. Continuing, at step 604, three-phase AC input lines are linked to the nodes in one of the step-up or unity gain node sets. At block 606, the nine output nodes are linked via lines to nine inputs of a nine-phase rectifier. At block 608, three-phase power is provided to the input nodes and transformation of the three-phase power to nine-phase occurs.

It should be understood that the methods and apparatuses described above are only exemplary and do not limit the scope of the invention, and that various modifications could be made by those skilled in the art that would fall under the scope of the invention. For example, referring again to FIG. 1, converter 11 may take any form including a nine-phase bridge, three three-phase linked bridges or any other topology known in the art.

To apprise the public of the scope of this invention, the following claims are made:

What is claimed is:

1. An autotransformer for converting three-phase AC power provided on first, second and third supply lines to nine-phase AC power on first through ninth output lines, the autotransformer comprising:
   a. first, second and third coils arranged such that there is 120 degree phase shift between coils, each coil including a plurality of serial windings linked together to form a polygon;
   b. a step-up input set including first, second and third input nodes between adjacent windings and separated by 120 degrees, the first, second and third input nodes linkable to the first, second and third supply lines, respectively; and
   c. first through ninth output nodes between adjacent windings which are linkable to the first through ninth output lines, respectively;
   d. wherein, the voltage magnitude at each of the nodes is measured by a vector between a neutral point and the node, the windings are sized and arranged such that the phase shift between adjacent output nodes is essentially 40 degrees, the voltage magnitudes at each of the output nodes are essentially identical, the voltage magnitudes at each of the step-up input set nodes are essentially identical and each step-up input node voltage magnitude is less than each output node voltage magnitude such that the transformer can be used as a step-up transformer.

2. The autotransformer of claim 1 wherein each coil forms five separate windings including first, second, third, fourth and fifth coil specific windings.

3. The autotransformer of claim 1 for use with a rectifier for converting the nine phase AC power to DC power, the nine output nodes linked to nine inputs of a nine-phase rectifier bridge.

4. The autotransformer of claim 2 wherein the windings are arranged such that the first coil first, second, third, fourth and fifth windings form first, fifth, seventh, ninth and thirteenth legs, respectively, the second coil first, second, third, fourth and fifth windings form second, fourth, eighth, eleventh and fifteenth legs, respectively, the third coil first, second, third, fourth and fifth windings form third, sixth, tenth, twelfth and fourteenth legs and the legs are linked in series first through fifteenth to form the polygon.

5. The autotransformer of claim 4 wherein the first through ninth output nodes are linked between the first and second legs, the second and third legs, the fourth and fifth legs, the sixth and seventh legs, the seventh and eighth legs, the ninth and tenth legs, the eleventh and twelfth legs, the twelfth and thirteenth legs and the fourteenth and fifteenth legs, respectively.

6. The autotransformer of claim 5 wherein the first, second and third input nodes are linked between the fifteenth and first legs, the fifth and sixth legs and the tenth and eleventh legs, respectively.

7. The autotransformer of claim 5 also including a unity gain input set including fourth, fifth and sixth input nodes between adjacent windings and separated by 120 degrees which are also linkable to the first, second and third input lines, each unity gain input set node voltage magnitude identical to each output node voltage magnitude such that the transformer can be used as a unity gain transformer.

8. The autotransformer of claim 7 wherein the fourth, fifth and sixth input nodes are linked between the first and second legs, the sixth and seventh legs and the eleventh and twelfth legs, respectively.

9. The autotransformer of claim 7 wherein the fourth, fifth and sixth input nodes are linked between the fourteenth and fifteenth legs, the fourth and fifth legs and the ninth and tenth legs, respectively.

10. A method for converting three-phase AC power provided on first, second and third supply lines to nine-phase stepped up AC power on first through ninth output lines, the method comprising the steps of:
   a. providing an autotransformer having first, second and third coils, each coil having a plurality of serial windings linked together to form a polygon having nodes between adjacent windings, the nodes including at least first through ninth output nodes, node voltage magnitudes measured by vectors between a neutral point and each node, the windings sized and arranged such that the phase shift between adjacent output nodes is essentially 40 degrees and the voltage magnitudes at the output nodes are essentially identical;
   b. linking the first, second and third supply lines to a first input set including first, second and third input nodes between adjacent windings, respectively, the input nodes separated by 120 degrees and having essentially identical voltage magnitudes, each of the first, second and third input node voltage magnitudes less than each output node voltage magnitudes;
   c. linking the first through ninth output lines to the first through ninth output nodes, respectively; and
   d. providing the three-phase AC power to the first through third input nodes such that the autotransformer operates as step-up transformer.

11. The method of claim 10 wherein the step of providing includes providing coils wherein each coil forms five separate windings including first, second, third, fourth and fifth coil specific windings.

12. The method of claim 10 for use with a rectifier for converting the nine phase AC power to DC power, the method also comprising the step of linking the nine output nodes to nine inputs of a nine-phase rectifier bridge.

13. The method of claim 11 wherein the step of providing includes arranging the windings such that the first coil first, second, third, fourth and fifth windings form first, fifth, seventh, ninth and thirteenth legs, respectively, the second coil first, second, third, fourth and fifth windings form second, fourth, eighth, eleventh and fifteenth legs, respectively, the third coil first, second, third, fourth and fifth windings form third, sixth, tenth, twelfth and fourteenth legs and linking the legs in series first through fifteen to form the polygon.

14. The method of claim 13 wherein the step of providing includes identifying the output nodes as follows:

first through ninth output nodes are linked between the first and second legs, the second and third legs, the fourth and fifth legs, the sixth and seventh legs, the seventh and eighth legs, the ninth and tenth legs, the eleventh and twelfth legs, the twelfth and thirteenth legs and the fourteenth and fifteenth legs, respectively.

15. The method of claim 13 wherein the step of linking the supply lines includes the step of linking the first, second and third supply lines between the fifteenth and first legs, the fifth and sixth legs and the tenth and eleventh legs, respectively, such that the voltage magnitudes as measured by a vector between a neutral point and each of the input nodes is less than the voltage magnitudes of each of the output nodes.

16. An autotransformer for converting three-phase AC power provided on first, second and third supply lines to nine-phase AC power on first through ninth output lines, the autotransformer comprising:

a. first, second and third coils arranged such that there is 120 degree phase shift between coils, each coil including a plurality of serial windings linked together to form a polygon;

b. a step-up input set including first, second and third input nodes between adjacent windings and separated by 120 degrees, the first, second and third input nodes linkable to the first, second and third supply lines, respectively;

c. a unity gain input set including fourth, fifth and sixth input nodes between adjacent windings and separated by 120 degrees, the fourth, fifth and sixth input nodes linkable to the first, second and third supply lines, respectively;

d. first through ninth output nodes between adjacent windings which are linkable to the first through ninth output lines, respectively;

e. wherein, the voltage magnitude at each of the nodes is measured by a vector between a neutral point and the node, the windings are sized and arranged such that the phase shift between adjacent output nodes is essentially 40 degrees, the voltage magnitudes at each of the output nodes are essentially identical, the voltage magnitudes at each of the step-up input set nodes are essentially identical and each step-up input node voltage magnitude is less than each output node voltage magnitude such that when the supply lines are linked to the step-up input set the transformer can be used as a step-up transformer and the voltage magnitude at each of the unity gain input set nodes are essentially identical and each unity gain input node voltage magnitude is essentially identical to each output node voltage magnitude such that when the supply lines are linked to the unity gain input set the transformer can be used as a unity gain transformer.

17. The autotransformer of claim 16 wherein each coil forms five separate windings including first, second, third, fourth and fifth coil specific windings.

18. The autotransformer of claim 16 for use with a rectifier for converting the nine phase AC power to DC power, the nine output nodes linked to nine inputs of a nine-phase rectifier bridge.

19. The autotransformer of claim 17 wherein the windings are arranged such that the first coil first, second, third, fourth and fifth windings form first, fifth, seventh, ninth and thirteenth legs, respectively, the second coil first, second, third, fourth and fifth windings form second, fourth, eighth, eleventh and fifteenth legs, respectively, the third coil first, second, third, fourth and fifth windings form third, sixth, tenth, twelfth and fourteenth legs and the legs are linked in series first through fifteenth to form the polygon.

20. The autotransformer of claim 19 wherein the first through ninth output nodes are linked between the first and second legs, the second and third legs, the fourth and fifth legs, the sixth and seventh legs, the seventh and eighth legs, the ninth and tenth legs, the eleventh and twelfth legs, the twelfth and thirteenth legs and the fourteenth and fifteenth legs, respectively.

21. The autotransformer of claim 5 wherein the first, second, third, fourth, fifth and sixth input nodes are linked between the fifteenth and first legs, the fifth and sixth legs, the tenth and eleventh legs, the fourteenth and fifteenth legs, the fourth and fifth legs and the ninth and tenth legs, respectively.

22. An isolation transformer for converting three-phase AC power provided on first, second and third supply lines to nine-phase AC power on first through ninth output lines, the transformer comprising:

a. a primary including first, second and third primary coils configured so as to be separated by 120 degrees phase shift and forming first, second and third input nodes, the first, second and third input nodes linkable to the first, second and third supply lines, respectively;

b. a secondary including:
(i) first, second and third secondary coils arranged such that there is 120 degree phase shift between coils, each coil including a plurality of serial windings linked together at secondary nodes to form a polygon, the first second and third secondary coils in phase with the first, second and third primary coils, respectively; and
(ii) first through ninth output nodes between adjacent windings which are linkable to the first through ninth output lines, respectively;

c. wherein, the voltage magnitude at each of the nodes is measured by a vector between a neutral point and the node, the windings are sized and arranged such that the phase shift between adjacent output nodes is essentially 40 degrees, the voltage magnitudes at each of the output nodes are essentially identical and at least a sub-set of the secondary nodes have magnitudes less than the output node magnitudes.

23. The transformer of claim 22 wherein each secondary coil forms five separate windings including first, second, third, fourth and fifth coil specific windings.

24. The transformer of claim 22 for use with a rectifier for converting the nine phase AC power to DC power, the nine output nodes linked to nine inputs of a nine-phase rectifier bridge.

25. The transformer of claim 23 wherein the windings are arranged such that the first secondary coil first, second, third, fourth and fifth windings form first, fifth, seventh, ninth and thirteenth legs, respectively, the second secondary coil first, second, third, fourth and fifth windings form second, fourth, eighth, eleventh and fifteenth legs, respectively, the third secondary coil first, second, third, fourth and fifth windings form third, sixth, tenth, twelfth and fourteenth legs and the legs are linked in series first through fifteenth to form the polygon.

26. The transformer of claim 25 wherein the first through ninth output nodes are linked between the first and second legs, the second and third legs, the fourth and fifth legs, the sixth and seventh legs, the seventh and eighth legs, the ninth and tenth legs, the eleventh and twelfth legs, the twelfth and thirteenth legs and the fourteenth and fifteenth legs, respectively.

27. The transformer of claim 22 wherein the primary coils are delta wound.

28. The transformer of claim 22 wherein the primary coils are Wye wound.

29. A method for converting three-phase AC power provided on first, second and third supply lines to nine-phase stepped up AC power on first through ninth output lines, the method comprising the steps of:

a. providing a transformer having a primary and a secondary, the primary including first, second and third primary coils linked together to form three input nodes and so that the coils are 120 degrees out of phase, the secondary including first, second and third secondary coils that are in phase with the first, second and third primary coils, respectively, each secondary coil having a plurality of serial windings linked together to form a polygon having secondary nodes between adjacent windings, the nodes including at least first through ninth output nodes, node voltage magnitudes measured by vectors between a neutral point and each node, the windings sized and arranged such that the phase shift between adjacent output nodes is essentially 40 degrees, the voltage magnitudes at the output nodes are essentially identical and the voltage magnitudes of at least a sub-set of the secondary nodes are less than the output node magnitudes;

b. linking the first, second and third supply lines to the first, second and third input nodes, respectively;

c. linking the first through ninth output lines to the first through ninth output nodes, respectively; and     c. providing the three-phase AC power to the first through third input nodes such that the transformer transforms the three phase input voltage to nine phase output voltage.

30. The method of claim 29 wherein the step of providing includes providing coils wherein each coil forms five separate windings including first, second, third, fourth and fifth coil specific windings.

31. The method of claim 30 wherein the step of providing includes arranging the windings such that the first secondary coil first, second, third, fourth and fifth windings form first, fifth, seventh, ninth and thirteenth legs, respectively, the second secondary coil first, second, third, fourth and fifth windings form second, fourth, eighth, eleventh and fifteenth legs, respectively, the third secondary coil first, second, third, fourth and fifth windings form third, sixth, tenth, twelfth and fourteenth legs and linking the legs in series first through fifteen to form the polygon.

32. The method of claim 31 wherein the step of providing includes identifying the output nodes as follows:

first through ninth output nodes are linked between the first and second legs, the second and third legs, the fourth and fifth legs, the sixth and seventh legs, the seventh and eighth legs, the ninth and tenth legs, the eleventh and twelfth legs, the twelfth and thirteenth legs and the fourteenth and fifteenth legs, respectively.

33. The method of claim 29 wherein the step of providing includes providing a primary wherein the primary coils are delta wound.

34. The method of claim 29 wherein the step of providing includes providing a primary wherein the primary coils are Wye wound.

\* \* \* \* \*